United States Patent Office 3,174,963
Patented Mar. 23, 1965

3,174,963
CHLOROQUINE ADENYLIC NUCLEOTIDES
Carol Farhi, New York, N.Y., assignor to Union Carbide Corporation, a corporation of New York
No Drawing. Filed Dec. 1, 1960, Ser. No. 72,867
4 Claims. (Cl. 260—211.5)

This invention relates to a new composition of matter and more particularly to novel chloroquine compositions for use in the treatment of certain rheumatoid diseases.

It is well known that certain chloroquine compounds, e.g. chloroquine diphosphate and hydroxychloroquine sulfate are effective in the treatment of joint inflammations such as occur in rheumatoid arthritis and the like. However, the adverse psychomotor activity usually accompanying such ailments, i.e. lassitude, nervousness, and loss of appetite, is not substantially alleviated by these known chloroquine compounds.

It is the general object of this invention to provide a chloroquine compound which will be effective in the treatment of rheumatoid diseases such as rheumatoid arthritis, rheumatic fever and the like, but which will also have a beneficial effect on the aforesaid psychomotor activity.

Other objects and advantages of this invention will appear from the following description and the appended claims.

According to this invention, novel chloroquine compounds having the advantages indicated above are provided by the combination of chloroquine with an adenylic nucleotide containing, in its configuration, adenine, ribose and one or more phosphate radicals. The novel compounds of this invention include chloroquine diadenylate and hydroxychloroquine adenylate.

The novel compounds of this invention may be conveniently prepared by reacting at least stoichiometric quantities of chloroquine with an adenylic nucleotide. In this regard, temperature and pressure requirements are not narrowly critical although it is preferable to carry out the process at room or slightly higher temperatures.

Exemplary of the chloroquine base compounds useful in the preparation of the novel compounds of this invention are chloroquine diphosphate and hydroxychloroquine sulfate. Exemplary of the nucleotide compounds useful in the preparation of the novel compounds of this invention are adenosine-3-monophosphate, adenosine-5-monophosphate, adenosine diphosphate (A.D.P.), adenosine triphosphate (A.T.P.), and cyclic adenosine 3,5-phosphate.

As stated above, the novel compounds of this invention are effective in treating joint inflammations and rheumatoid disorders. In this regard, they counteract the muscular wasting and weakness attendant with such disorders by increasing muscular tonus and rebuilding muscular strength.

In addition, the novel chloroquine adenylates of this invention effectively combat the aforesaid psychomotor activity also attendant with the stated disorders. Therefore, the lassitude, nervousness, weight loss and lack of appetite prevalent in rheumatoid conditions, and which are also perhaps a side effect of known chloroquine therapy, are effectively alleviated by the novel compositions of this invention. This beneficial property of the subject compounds probably arises from the adenylate detoxifying effects. The latter adenylate moiety also acts as a metabolic stimulant.

A further advantage of the compositions of this invention resides in the fact they will inhibit A.T.P.(ase) enzyme activity. This is significant since it is thought that the rheumatoid process in rheumatoid arthritis is at least partly based on enhanced enzymatic activity by A.T.P.(ase), which leads to the over-rapid breakdown of the A.T.P. In this connection, the novel adenylates of this invention will also serve as replacement therapy for the loss of nucleotide resulting from the depletion of the rapid energy donating system by the increased enzymatic activity, the chloroquine moiety apparently behaving as an inhibitor of A.T.P.(ase) activity. As a consequence, the novel compounds of this invention shorten the time needed for chloroquine therapy and prolong the effect thereof. In this regard, high concentrations remain in the blood plasma for as long as five days. Moreover, the novel compositions of this invention also extend the action of and prolong the effect of the adenylate moiety. Hence, the chloroquine and adenylate moieties have a synergistic effect, each increasing the effect of the other.

The novel compositions of this invention can be administered orally in several ways. For example, the powder can be encapsulated in hard or soft capsules. In addition, a granulation of sugar coated or compressed tablets may be made by adding a diluent and binder such as starch and glucose to the chloroquine diadenylate thereby forming a granulation suitable for tableting in standard punch size. Suitable colors may also be added. After the exact amount of granulation to be made into each tablet is calculated, the tablets may then be compressed and the sugar coating may be applied if desired.

Another suitable form of administration is a sublingual tablet made by mixing the novel compositions of this invention with polyethylene glycol or other pharmaceutical carriers and adding filler, color and flavor, in amounts sufficient for the tablets to be of standard punch size. Standard procedures of manufacture may then be followed. The latter form of administration, i.e. as a sublingual tablet, is preferred for the practice of this invention.

For use, the dosage should preferably be from 100 milligrams to 300 milligrams per tablet or capsule. A particularly preferred dosage range is from 100 milligrams to 200 milligrams per tablet or capsule.

The novel compositions of this invention are also useful in treating arthritis in small and large animals. This is particularly the case in animals such as dogs where arthritis and particularly rheumatoid arthritis is common. Chronic inflammatory conditions often result and lameness is often caused thereby. The dosage range for use in dogs ranges from 100 milligrams to 200 milligrams.

The novel compositions of this invention are useful in treating tendonitis in large animals such as horses, particularly where the inflammation of the tendon appears after forced exercise. This is quite prevalent in race horses, where overexertion leads to a depletion of the high energy phosphate levels. The adenylate moiety of the novel compositions of this invention supplies a specific metabolic stimulant to the muscle leading to an immediate increase in muscle energy available, the chloroquine or hydroxychloroquine acting as noted to relieve the inflammation. In the category of diseases in which this medication is helpful, are animal bursitis including capped elbow, stringhalt, and Sweeney shoulder. In this latter condition a srinkage or atrophy of the muscles of the shoulder region takes place due to lack of use, which disturbs the normal function of the energy cycles of the adenylic nucleotides. The return to normal muscle is appreciably accelerated by the application of the novel compounds of this invention. The recommended dosage for use in large animals is between 300 milligrams and 900 milligrams.

The invention may be further indicated by the following purely illustrative examples:

EXAMPLE I

*Chloroquine diadenylate*

One millimole (515.88 mg.) of chloroquine diphosphate was dissolved in 10 cc. of distilled water. To the solution there was added 5 cc. of a 30% sodium hydroxide solution. The solution was thereupon stirred until all of the chloroquine base settled as a gum. The supernatant was decanted and the gum was worked until neutral. The gum was thereupon dissolved in 10 cc. of isopropanol. This solution was added with stirring to a slurry of 694.44 mg. of adenylic acid in 25 cc. of water.

When all of the adenylic acid went into solution, the solution was concentrated to dryness. A white granulated product resulted having a melting point of 105–115° C. Infra-red spectra indicated the formation of the chloroquine diadenylate. The structure of this compound is believed to be the following:

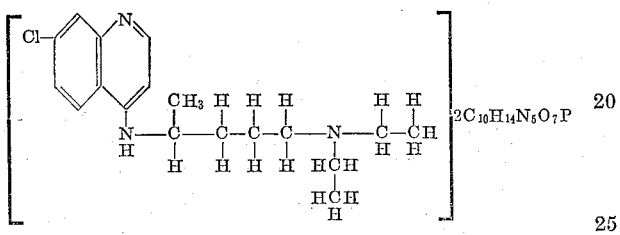

EXAMPLE II

*Hydroxychloroquine adenylate*

One millimole (44.5 mg.) of hydroxychloroquine sulfate was dissolved in 10 cc. of distilled water. To this solution there was added 5 cc. of 30% sodium hydroxide solution. The solution was stirred until all of the hydroxychloroquine base settled out as a gum. The supernatant was decanted. The gum was washed until neutral. The gum was then dissolved in 10 cc. of isopropanol. This solution was thereupon added with stirring to a slurry of 694.44 mg. of adenylic acid in 25 cc. of water.

When all of the adenylic acid went into solution, the product was concentrated to dryness. The product was determined to be hydroxychloroquine adenylate.

What is claimed is:

1. Chloroquine diadenylic acid.
2. Hydroxychloroquine adenylic acid.
3. Chloroquine adenylic nucleotide, wherein said nucleotide contains from 1 to 3 phosphates.
4. The composition according to claim 3, in which the nucleotide is a member selected from the group consisting of adenosine-3-monophosphate, adenosine-5-monophosphate, adenosine diphosphate, adenosine triphosphate, and cyclic adenosine-3,5-monophosphate.

References Cited in the file of this patent
UNITED STATES PATENTS

| | | |
|---|---|---|
| 2,700,038 | Lipton et al. | Jan. 18, 1955 |
| 2,719,843 | Davoll et al. | Oct. 4, 1955 |
| 2,890,152 | Babcock et al. | Jan. 9, 1959 |
| 2,935,448 | Calder | May 3, 1960 |

OTHER REFERENCES

Merck Index, 6th ed., 1952, p. 234.
Devolt: Poultry Science, 26:6, pp. 924–926, November 1950.
Surrey et al.: "J. Amer. Chem. Soc.," vol. 68, 1946, pp. 113–116.
Pack et al.: "J. Amer. Chem. Soc.," vol. 81, 1959, pp. 3984, 3989.